(12) United States Patent
Sukhadia et al.

(10) Patent No.: US 8,852,748 B2
(45) Date of Patent: Oct. 7, 2014

(54) POLYETHYLENE FILM HAVING IMPROVED BARRIER PROPERTIES AND METHODS OF MAKING SAME

(75) Inventors: Ashish M. Sukhadia, Bartlesville, OK (US); Max P. McDaniel, Bartlesville, OK (US); Ted Cymbaluk, Kemah, TX (US); Rajendra K. Krishnaswamy, Lexington, MA (US); Lawrence Szmutko, Orange, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 221 days.

(21) Appl. No.: 12/394,636

(22) Filed: Feb. 27, 2009

(65) Prior Publication Data

US 2010/0221475 A1    Sep. 2, 2010

(51) Int. Cl.
| | | |
|---|---|---|
| C08F 210/00 | (2006.01) | |
| C08F 110/02 | (2006.01) | |
| B32B 27/08 | (2006.01) | |
| C08J 5/18 | (2006.01) | |

(52) U.S. Cl.
CPC .......... *C08F 110/02* (2013.01); *C08J 5/18* (2013.01); *C08J 2323/04* (2013.01)
USPC ........ 428/515; 526/348.1; 526/352; 525/191; 525/240; 428/500; 428/523; 428/98

(58) Field of Classification Search
USPC ........... 428/334, 219; 524/388, 396; 526/352, 526/348.1
See application file for complete search history.

(56) References Cited

U.S. PATENT DOCUMENTS

| | | | |
|---|---|---|---|
| 3,248,179 | A | 4/1966 | Norwood |
| 3,976,632 | A | 8/1976 | Delap |
| 4,182,815 | A | 1/1980 | McDaniel et al. |
| 4,501,885 | A | 2/1985 | Sherk et al. |
| 4,588,790 | A | 5/1986 | Jenkins, III et al. |
| 5,352,749 | A | 10/1994 | DeChellis et al. |
| 5,436,304 | A | 7/1995 | Griffin et al. |
| 5,455,314 | A | 10/1995 | Burns et al. |
| 5,565,175 | A | 10/1996 | Hottovy et al. |
| 5,575,979 | A | 11/1996 | Hanson |
| 6,239,235 | B1 | 5/2001 | Hottovy et al. |
| 6,262,191 | B1 | 7/2001 | Hottovy et al. |
| 6,833,415 | B2 | 12/2004 | Kendrick et al. |
| 7,019,089 | B2 | 3/2006 | Schneider et al. |
| 2008/0227900 | A1* | 9/2008 | Borke et al. .................. 524/388 |

FOREIGN PATENT DOCUMENTS

| | | |
|---|---|---|
| EP | 0 669 347 | 8/1995 |
| EP | 1041085 A1 | 10/2000 |
| WO | WO 99/40126 | 8/1999 |
| WO | 0134661 A1 | 5/2001 |
| WO | WO 01/70828 | 9/2001 |
| WO | 2004076499 A1 | 9/2004 |

OTHER PUBLICATIONS

Office Action dated Jun. 17, 2010 (11 pages), U.S. Appl. No. 12/394,651, filed Feb. 27, 2009.
Bird, R. Byron, et al., "Dynamics of polymeric liquids. vol. 1: Fluid Mechanics," 2nd Edition, 1987, pp. xiii to xviii, pp. 171-172, 1 cover page, and 1 publication page, A Wiley-Interscience Publication, John Wiley & Sons, Inc., USA.
CP Chem Marketing Brochure, MarFlex Polyethlene Data Sheet, HiD® 9659, 2 pages, May 2000.
Dealy, J. M., et al., "Melt Rheology and its Role in Plastics Processing: Theory and Applications," Chapman and Hall, first publication by Van Nostrand Reinhold, New York, (1990), cover page, publication page, and 2 additional pages.
Equistar Chemicals, LP Marketing Brochure, Alathon® M6020, High Density Polyethylene, 1 page, Sheet 2065, Sep. 2003.
Equistar Chemicals, LP Marketing Brochure, Alathon® M6210, High Density Polyethylene, 1 page, Sheet 2067, Sep. 2003.
Hieber, C. A., et al., "Some correlations involving the shear viscosity of polystyrene melts," Rheologica Acta.,1989, pp. 321-332, vol. 28, No. 4.
Hieber, C. A., et al., "Shear-rate-dependence modeling of polymer melt viscosity," Polymer Engineering and Science , Jul. 1992, vol. 32, No. 14, pp. 931-938.
Patent application entitled "Polyethylene film having improved barrier properties and methods of making same," by Ashish Sukhadia, et al., filed Feb. 27, 2009 as U.S. Appl. No. 12/394,651.
Standard Test 104-97, "Initial Tension and Extrusion Coerfficient," Aug. 6, 1997, 7 pages.
Search Report for International Patent Application PCT/US2010/000508.
Office Action dated Mar. 2, 2011 (4 pages), U.S. Appl. No. 12/394,651, filed Feb. 27, 2009.
Notice of Allowance dated Mar. 30, 2011 (9 pages), U.S. Appl. No. 12/394,651, filed Feb. 27, 2009.
Final Office Action dated Dec. 7, 2010 (9 pages), U.S. Appl. No. 12/394,651, filed Feb. 27, 2009.

* cited by examiner

*Primary Examiner* — Ellen S Raudenbush
(74) *Attorney, Agent, or Firm* — Conley Rose, P.C.; Rodney B. Carroll; Cheryl L. Huseman

(57) ABSTRACT

A polymeric resin having a density of greater than about 0.960 g/cc, a melt index of from about 1.3 g/10 min. to about 2.8 g/10 min., a zero shear viscosity of from about $1\times10^4$ Pa*s to about $1\times10^5$ Pa*s, a recoverable shear parameter of from about 220 to about 370, and a CY-a parameter of from about 0.155 to about 0.200. A polymeric resin having an initial tension defined by the equation $IT \geq -1.67*(MI)+b$ where b is 5.17 and a percent decrease in the extrusion pressure of the resin of about 30% when compared to polymer resin of similar melt index prepared with a catalyst that has not undergone an activation comprising an oxidation, reduction, oxidation sequence wherein the resin when formed into a film has a moisture vapor transmission rate of from about 0.21 g.mil/100 in²/day to about 0.33 g.mil/100 in²/day.

20 Claims, No Drawings

POLYETHYLENE FILM HAVING IMPROVED BARRIER PROPERTIES AND METHODS OF MAKING SAME

CROSS-REFERENCE TO RELATED APPLICATIONS

The subject matter of the present application is related to U.S. patent application Ser. No. 12/394,651, filed concurrently herewith and entitled "Polyethylene Film Having Improved Barrier Properties and Methods of Making Same," which is hereby incorporated herein by reference in its entirety for all purposes.

FIELD

The present disclosure relates to polyethylene (PE) resin. More specifically, the present disclosure relates to methods of preparing polymerization catalysts that produce PE resin, the PE resin produced thereby and their applications.

BACKGROUND

Polyolefins are plastic materials useful for making a wide variety of valued products due to their combination of stiffness, ductility, barrier properties, temperature resistance, optical properties, availability, and low cost. One of the most valued products is plastic films. In particular, PE is the one of the largest volume polymers consumed in the world. It is a versatile polymer that offers high performance relative to other polymers and alternative materials such as glass, metal or paper. Plastic films such as PE films are mostly used in packaging applications but they also find utility in the agricultural, medical and engineering fields.

PE films are manufactured in a variety of grades that are usually differentiated by the polymer density such that PE films can be designated for example, low density polyethylene (LDPE), linear low density polyethylene (LLDPE), medium density polyethylene (MDPE), and high density polyethylene (HDPE), wherein each density range has a unique combination of properties making it suitable for a particular application.

Despite the many positive attributes of PE, the film product remains permeable to gases such as oxygen or carbon dioxide and/or moisture (e.g., water). Thus, it would be desirable to develop a PE film product exhibiting improved barrier properties

SUMMARY

Disclosed herein is a polymeric resin having a density of greater than about 0.960 g/cc, a melt index of from about 1.3 g/10 min. to about 2.8 g/10 min., a zero shear viscosity of from about $1 \times 10^4$ Pa*s to about $1 \times 10^5$ Pa*s, a recoverable shear parameter of from about 220 to about 370, and a CY-a parameter of from about 0.155 to about 0.200.

Also disclosed herein is a polymeric resin having an initial tension defined by the equation IT≥−1.67*(MI)+b where b is 5.17 and a percent decrease in the extrusion pressure of the resin of about 30% when compared to polymer resin of similar melt index prepared with a catalyst that has not undergone an activation comprising an oxidation, reduction, oxidation sequence wherein the resin when formed into a film has a moisture vapor transmission rate of from about 0.21 g.mil/100 in$^2$/day to about 0.33 g.mil/100 in$^2$/day.

Further disclosed herein is a method comprising (a) providing a catalyst comprising chromium and a support having a pore volume of from about 1.7 ml/g to about 3.5 ml/g and a surface area of from about 450 m$^2$/g to about 700 m$^2$/g, (b) oxidizing the catalyst at a temperature of from about 500° C. to about 900° C. for a period of time of from about 1 hour to about 12 hours in an oxidizing atmosphere comprising from about 5 mol. % to about 100 mol. % oxygen to form an oxidized catalyst, (c) reducing the oxidized catalyst at a temperature of from about 700° C. to about 900° C. for a period of time of from about 1 hour to about 12 hours in a reducing atmosphere comprising from about 5 mol. % to abut 100 mol. % carbon dioxide to form an oxidized reduced catalyst, (d) oxidizing the oxidized reduced catalyst at a temperature of from about 500° C. to about 900° C. for a period of time of from about 1 hour to about 10 hours in an oxidizing atmosphere comprising from about 5 mol. % to about 100 mol. % oxygen to form an activated catalyst, (e) contacting the activated catalyst with an olefin under conditions suitable to form a polyolefin, and (f) recovering the polyolefin, wherein the polyolefin has a density of greater than about 0.960 g/cc and a melt index of from about 1.3 g/10 min. to about 2.8 g/10 min.

Further disclosed herein is a method comprising (a) providing a catalyst comprising chromium and a support having a pore volume of from about 1.7 ml/g to about 3.5 ml/g and a surface area of from about 450 m$^2$/g to about 700 m$^2$/g, (b) oxidizing the catalyst to form an oxidized catalyst, (c) reducing the oxidized catalyst to form an oxidized reduced catalyst, (d) oxidizing the oxidized reduced catalyst to form an activated catalyst, (e) contacting the activated catalyst with an olefin under conditions suitable to form a polyolefin, and (f) recovering the polyolefin, wherein the polyolefin has a density of greater than about 0.960 g/cc and a melt index of from about 1.3 g/10 min. to about 2.8 g/10 min.

DETAILED DESCRIPTION

Disclosed herein are catalyst compositions, polymer compositions, and methods of making and using same. In an embodiment, the catalyst composition comprises a supported chromium compound. The catalyst compositions of this disclosure may function as polymerization catalysts that produce polymers (e.g., PE) exhibiting desirable barrier and/or processing characteristics. Such catalyst and polymer compositions are described in detail herein.

In an embodiment, the catalyst composition comprises a support. The support may primarily include an inorganic oxide such as such as silica, silica-titania, alumina-titania, aluminophosphates, magnesia, zirconia, silica-zirconia, alumina-zirconia, ceria, ceria-zirconia, clay, zeolites, or combinations thereof. In an embodiment, the support comprises silica which is present in an amount of greater than about 50 weight percent (wt. %) silica by total weight of the support, alternatively greater than about 80 wt. %, alternatively greater than about 90 wt. %, alternatively greater than about 95, 96, 97, 98, 99, 99.5 or 99.8 wt. %. In an alternative embodiment the support comprises silica-titania which is present in an amount of greater than about 50 weight percent (wt. %) silica-titania by total weight of the support, alternatively greater than about 80 wt. %, alternatively greater than about 90 wt. %, alternatively greater than about 95, 96, 97, 98, 99, 99.5 or 99.8 wt. %. The support may include additional components that do not adversely affect the catalyst system, such as zirconia, alumina, boria, thoria, magnesia, or mixtures thereof.

The support may be further characterized by a surface area and pore volume effective to provide for an active catalyst. The surface area of the support may range from about 400 square meters per gram (m²/g) to about 1,000 m²/g, alternatively from about 450 m²/g to about 700 m²/g, or from about 480 m²/g to about 600 m²/g. The pore volume of the support may range from about 1.7 mililiters per gram (mL/g) to about 3.5 mL/g, alternatively from about 1.8 mL/g to about 3.0 mL/g, or from about 2.0 mL/g to about 3.0 mL/g. Further, the support may have an average particle size in the range of from about 5 μm to about 500 μm, alternatively from about 20 μm to about 250 μm, or from about 30 μm to about 150 μm.

The support (e.g., silica) may be present in the catalyst system in amounts of from about 50 wt. % to about 99 wt. % support by weight of the catalyst system, alternatively from about 75 wt. % to about 99 wt. %, alternatively from about 80 wt. % to about 95 wt. %, alternatively from about 85 wt. % to about 95 wt. %, alternatively from about 90 wt. % to about 95 wt. %. Herein the percentage of support refers to the final weight percent of support associated with the catalyst by total weight of the catalyst after all processing steps.

In an embodiment, the catalyst composition comprises chromium. Chromium may be introduced to the catalyst composition via contacting one or more of the other components of the catalyst system (e.g., the silica support) with a chromium-containing compound. The chromium-containing compound may comprise a water-soluble chromium compound or a hydrocarbon-soluble chromium compound. Examples of water-soluble chromium compounds include chromium trioxide, chromium acetate, chromium nitrate, or combinations thereof. Examples of hydrocarbon-soluble chromium compounds include tertiary butyl chromate, a diarene chromium (0) compound, biscyclopentadienyl chromium(II), chromium (III) acetylacetonate, or combinations thereof. The chromium-containing compound may be a chromium (II) compound, chromium (III) compound, a chromium (VI) compound, or combinations thereof. Suitable chromium (III) compounds include, but are not limited to, chromium carboxylates, chromium naphthenates, chromium halides, chromium pyrrolides, chromium benzoates, chromium dionates, chromium nitrates, chromium sulfates, or combinations thereof. Specific chromium (III) compounds include, but are not limited to, chromium (III) isooctanoate, chromium (III) 2,2,6,6-tetramethylheptanedionate, chromium (III) naphthenate, chromium (III) chloride, chromium (III) tris(2-ethylhexanoate), chromium (III) oxy-2-ethylhexanoate, chromium (III) dichloroethylhexanoate, chromium (III) acetylacetonate, chromium (III) acetate, chromium (III) butyrate, chromium (III) neopentanoate, chromium (III) laurate, chromium (III) sulfate, chromium (III) oxalate, chromium (III) benzoate, chromium (III) pyrrolide(s), chromium (III) perchlorate, chromium (III) chlorate, or combinations thereof. Suitable chromium (II) compounds include, but are not limited to, chromous fluoride, chromous chloride, chromous bromide, chromous iodide, chromium (II) bis(2-ethylhexanoate), chromium (II) acetate, chromium (II) butyrate, chromium (II) neopentanoate, chromium (II) laurate, chromium (II) stearate, chromium (II) oxalate, chromium (II) benzoate, chromium (II) pyrrolide(s), chromous sulfate, or combinations thereof. Examples of other suitable chromium-containing compounds include tertiary butyl chromate in a hydrocarbon liquid; chromium trioxide in water or acetonitrile; chromium acetate in water; chromium nitrate in alcohol; zerovalent organochromium compounds such as pi bonded chromium complexes, for example, dicumene chromium and dibenzene chromium in a hydrocarbon; or combinations thereof. Pi bonded chromium complexes are described in U.S. Pat. No. 3,976,632, which is incorporated by reference herein in its entirety.

The amount of chromium present in the catalyst composition may range from about 0.01 wt. % to about 10 wt. % chromium by weight of the catalyst composition, alternatively from about 0.2 wt. % to about 1.5 wt. % chromium, alternatively from about 0.5 wt. % to about 1.1 wt. % chromium. Herein the percentage chromium refers to the final weight percent chromium associated with the catalyst composition by total weight of the catalyst composition after all processing steps.

In an embodiment, the catalyst composition comprises titanium. Titanium may be introduced to the catalyst composition via contacting one or more of the other components of the catalyst system (e.g., the silica support before and/or after contacting with the chromium-containing compound) with a titanium-containing compound. Alternatively, chromium-containing compound and titanium-containing compound may be co-introduced to the catalyst composition by contacting with one or more of the other components of the catalyst composition (e.g., the support such as silica). The titanium-containing compound may comprise a water-soluble titanium compound or a hydrocarbon-soluble titanium compound. Nonlimiting examples of suitable Ti-containing compounds include $TiOSO_4$, titanium tetraisopropoxide, $TiCl_4$, $TiCl_3$, $Ti(SO_4)_3$, titanium peroxo complex, titanyl acetylacetonate titanium oxylate and combinations thereof. Such compounds may be contacted with a support by any suitable technique to provide a percentage titanium of from about 0 wt. % to about 8 wt. % titanium, alternatively from about 1 wt. % to about 7 wt. % titanium, alternatively from about 2 wt. % to about 5 wt. %. Herein the percentage titanium refers to the final weight percentage titanium associated with the catalyst by total weight of the catalyst after all processing steps.

The chromium-containing support may be prepared by contacting a chromium-containing compound and a support, both of the types described previously herein. In an embodiment, the support consists essentially of silica and the chromium-containing support may be prepared by contacting a chromium-containing compound and silica to form a Cr-silica support. In another embodiment, the chromium-containing support may be prepared by contacting a chromium-containing compound and a support comprising silica-titania to form a Cr/silica-titania support. In yet another embodiment, the support comprises silica and the catalyst precursor is prepared by contacting a chromium-containing compound, a titanium containing compound and the silica to form a Cr/Ti-silica support. In another embodiment the silica and and chromia, or the silica and chromia and titania are made by cogellation or co-precipitation.

The chromium-containing compound and support may be contacted using any suitable methodology. Examples of suitable contacting techniques include without limitation ion-exchange, incipient wetness, pore fill, aqueous impregnation, organic solvent impregnation, melt coating, co-gelling, dry mixing, or combinations thereof. The resulting material is designated a Cr-support. Hereinafter, unless otherwise indicated, the disclosure will focus on the use of a Cr-support which may refer to a Cr-silica support, a Cr/Ti-silica support, a Cr/silica-titania support or combinations thereof.

In some embodiments, following contacting of the components (i.e., chromium-containing compound and support), the Cr-support may be washed and/or dried to remove any solvent used during impregnation of the metal. The drying may be carried out in a temperature range of from about 25° C. to about 300° C., alternatively from about 50° C. to about 200° C., alternatively from about 80° C. to about 150° C. and for a time of from about 0.1 min to about 10 hours, alternatively from about 0.2 min to about 5 hours, alternatively from about 30 min to about 1 hour.

In another embodiment, a method of preparing a catalyst precursor comprises contacting the support with a titanium-containing compound and a chromium-containing compound to form a metallated silica. The contacting of the support with the titanium containing compound and chromium-containing compound may be simultaneous; alternatively the contacting may be carried out sequentially (e.g., Ti followed by Cr or vice-versa). The titanium-containing compound and chromium-containing compound may be of the types previously described herein and may be introduced to the support using the contacting techniques also previously described herein. The metallated silica may be dried to remove solvent at temperatures ranging from about 25° C. to about 300° C., alternatively from about 50° C. to about 200° C., alternatively from about 80° C. to about 150° C. and for a time of from about 0.1 min to about 10 hours, alternatively from about 0.2 min to about 5 hours, alternatively from about 30 min to about 1 hour.

In an embodiment, the catalyst precursor (i.e., Cr-support) is activated to produce a catalyst. In an embodiment, a method of activating the catalyst precursor comprises heating the catalyst precursor to a temperature in the range of from about 500° C. to about 900° C., alternatively from about 700° C. to about 900° C., or alternatively from about 800° C. to about 900° C. Hereinafter the temperature may be increased by using any suitable technique. In an embodiment, the temperature may be ramped at a rate of from about 0.1deg C./min to 10deg C./min, alternatively from about 1deg C./min to about 5deg C./min, alternatively from about 2deg C./min to about 4deg C./min. Heating of the catalyst precursor may be carried out in an oxidizing atmosphere. The oxidizing atmosphere may comprise oxygen, air, or combinations thereof. In an embodiment, the oxidizing atmosphere contains oxygen in an amount of from about 5 mole % (mol. %) to about 100 mol. %, alternatively from about 10 mol. % to about 50 mol. %, or alternatively from about 15 mol. % to about 25 mol. %. The catalyst precursor may be subjected to heating in an oxidizing atmosphere as described for a period of time of from about 1 hour to about 12 hours, or alternatively from about 2 hours to about 6 hours, or alternatively from about 2 hours to about 4 hours. The resulting material is termed an oxidized catalyst precursor.

The method of activation of a catalyst precursor of the type described herein may further comprise heating the oxidized catalyst precursor to a temperature in the range of from about 500° C. to about 900° C., or alternatively from about 700° C. to about 900° C., or alternatively from about 800 to about 900° C. Heating of the oxidized catalyst precursor may be carried out in a reducing atmosphere. In some embodiments, the reducing environment is established by first flushing out the oxidizing atmosphere with an inert gas. Examples of inert gases suitable for use in this disclosure include nitrogen, helium, and carbon dioxide. The oxidized catalyst precursor may then be subjected to a reducing gas such as for example carbon monoxide. In an embodiment, the reducing gas contains carbon monoxide in a range of from about 5 mol % to about 100 mol %, alternatively from about 5 mol % to about 50 mol %, or alternatively from about 10 mol % to about 25 mol %. The reducing gas may be contacted with the oxidized catalyst precursor for a period of time of from about 1 hour to about 12 hours, or alternatively from about 2 hours to about 6 hours, or alternatively from about 2 hours to about 4 hours. Following contact with a reducing gas, the resulting material is termed an oxidized-reduced catalyst precursor.

The method of activation of a catalyst precursor of the type described herein may further comprise oxidizing the oxidized reduced catalyst precursor to form a catalyst. The oxidized-reduced catalyst precursor may be heated at a temperature in the range of from about 500° C. to about 900° C., or alternatively from about 500° C. to about 800° C., or alternatively from about 550° C. to about 750° C. Heating of the oxidized reduced catalyst precursor may be carried out in an oxidizing atmosphere. The oxidizing atmosphere may be of the type described previously herein having a mole percentage oxygen in the ranges also previously described herein. The oxidized reduced catalyst precursor may be subjected to an oxidizing atmosphere, for a period of time of from about 1 hour to about 10 hours, or alternatively from about 2 hours to about 5 hours, or alternatively from about 2 hours to abut 4 hours. The resultant material is a catalyst that may function in the polymerization of monomers (e.g., alpha-olefins) to produce a polymeric material (e.g., PE). For example, a catalyst prepared as described herein may function as a polymerization catalyst which may contain at least a portion of the total chromium as Cr(VI). Without wishing to be limited by theory, the polymerization catalyst may have the metals (i.e. Cr(VI)) undergo reaction with a monomer (e.g., alpha olefin) to generate divalent chromium Cr(II) which may serve as the active site for polymerization of an alpha olefin. Hereinafter catalysts prepared as described herein are termed oxidized reduced oxidized catalysts (OROCs).

The polymerization catalysts of the present disclosure (OROCs) may be suitable for various alpha olefin polymerization methods, using various types of polymerization reactors. As used herein, "polymerization reactor" includes any polymerization reactor capable of polymerizing alpha olefin monomers (e.g., ethylene) to produce homopolymers or copolymers. Such homopolymers and copolymers are referred to as resins or polymers. The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present disclosure may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the disclosure, the polymerization reactor system may comprise at least one loop slurry reactor. Such reactors may comprise vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), which is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4588,790 and 5,436,304, each of which is incorporated by reference in its entirety herein.

According to still another aspect of the disclosure, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

In an embodiment, a slurry polymerization process is employed in which the catalyst is suspended in an inert organic medium and agitated to maintain it in suspension throughout the polymerization process. The organic medium may, e.g., be a paraffin, a cycloparaffin, or an aromatic. For the production of ethylene polymers, the slurry polymerization process may be carried out in a reaction zone at a temperature of from about 50° C. to about 110° C. and at a pressure in the range of from about 100 psia to about 700 psia or higher. At least one monomer is placed in the liquid phase of the slurry in which the catalyst is suspended, thus providing for contact between the monomer and the catalyst. The activity and the productivity of the catalyst are relatively high. As used herein, the activity refers to the grams of polymer produced per gram of solid catalyst charged per hour, and the productivity refers to the grams of polymer produced per gram of solid catalyst charged.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, resistance to crack growth, long chain branching and rheological measurements.

The concentrations of monomer, co-monomer, hydrogen, co-catalyst, modifiers, and electron donors are important in producing these resin properties. Comonomer is used to control product density. Hydrogen is used to control product molecular weight. Co-catalysts can be used to alkylate, scavenge poisons and control molecular weight. Modifiers can be used to control product properties and electron donors affect stereoregularity. In addition, the concentration of poisons must be minimized since they impact the reactions and product properties.

After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

In an embodiment, an OROC is used in the polymerization of alpha-olefins. Alternatively, an OROC may be used in the polymerization of ethylene to polyethylene. Polymers such as polyethylene homopolymers may be produced in the manner described previously herein.

In an embodiment, a polymeric composition (e.g., polyethylene) produced using an OROC is characterized by a density equal to or greater than about 0.960 grams per cubic centimeter (g/cc), alternatively equal to or greater than 0.962 g/cc, or alternatively equal to or greater than 0.963 g/cc.

In an embodiment, a polymer composition (e.g., polyethylene) produced using an OROC has a melt index, MI, in the range of from about 1.3 grams per 10 minutes (g/10 min) to about 2.8 g/10 min, alternatively from about 1.5 g/10 min to about 2.5 g/10 min, or alternatively from about 1.7 g/10 min to about 2.2 g/10 min. The melt index (MI) refers to the amount of a polymer which can be forced through an extrusion rheometer orifice of 0.0825 inch diameter when subjected to a force of 2160 grams in ten minutes at 190° C., as determined in accordance with ASTM D 1238.

In an embodiment, a polymer composition (e.g., polyethylene) produced using an OROC has a Recoverable Shear Strain Parameter (RSP) in the range of from about 220 to about 370, alternatively from about 250 to about 350, or alternatively from about 270 to about 330. A quantitative measurement of the rheological differences among various polymer resins is the estimation of the RSP. Recoverable shear strain for a rubberlike material is defined by Equation (1):

$$RSP = \frac{N_1}{2\tau} \quad (1)$$

where $N_1$ is the first normal stress difference and $\tau$ is the shear stress. Details of the significance and interpretation of Equation (1) may be found in: J. M. Dealy, K. F. Wissbrun, *Melt Rheology and its Role in Plastics Processing: Theory and Applications*, Van Nostrand Reinhold, New York, (1990), which is incorporated by reference herein in its entirety. At low frequencies, the recoverable shear can be approximated by Equation (2):

$$RSP \approx \frac{G'}{\omega \cdot |\eta^*|} \quad (2)$$

where G' represents the elastic part of the dynamic shear modulus while $|\eta^*|$ and $\omega$ represent the magnitudes of the corresponding complex viscosity (using Cox-Merz rule) and frequency, respectively. Applying this approximation in the low frequency range (for example, $\omega=0.03$ s$^{-1}$), the RSP values for can obtained for a resin. The RSP values presented in this disclosure are obtained as described above using Equation (2), and are multiplied by a constant factor of 1000.

In an embodiment, a polymer composition (e.g., polyethylene) produced using an OROC has a Carreau Yasuda 'a' parameter, CY-a, in the range of from about 0.155 to about 0.200, alternatively from about 0.160 to about 0.190, or alternatively from about 0.165 to about 0.185. The Carreau Yasuda 'a' parameter (CY-a) is defined as the rheological breath parameter. Rheological breadth refers to the breadth of the transition region between Newtonian and power-law type shear rate for a polymer or the frequency dependence of the viscosity of the polymer. The Theological breadth is a function of the relaxation time distribution of a polymer resin, which in turn is a function of the resin molecular structure or architecture. The CY-a parameter may be obtained by assuming the Cox-Merz rule and calculated by fitting flow curves generated in linear-viscoelastic dynamic oscillatory frequency sweep experiments with a modified Carreau-Yasuda (CY) model, which is represented by Equation (3):

$$E = E_o[1 + (T_\xi \dot{\gamma})^a]^{\frac{n-1}{a}} \quad (3)$$

where
E=viscosity (Pa·s)
$\dot{\gamma}$=shear rate (1/s)
a=rheological breadth parameter
$T_\xi$=relaxation time (s) [describes the location in time of the transition region]
$E_o$=zero shear viscosity (Pa·s) [defines the Newtonian plateau]
n=power law constant [defines the final slope of the high shear rate region]

To facilitate model fitting, the power law constant n is held at a constant value. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987), each of which is incorporated by reference herein in its entirety.

In an embodiment, a polymer composition (e.g., polyethylene) produced using an OROC has a zero shear viscosity ($E_o$), defined by Equation (3), in the range of from about $1\times10^4$ pascal·second (Pa·s) to about $1\times10^5$ Pa·s, alternatively from about $1\times10^4$ Pa·s to about $8\times10^4$ Pa·s, or alternatively from about $2\times10^4$ Pa·s to about $6\times10^4$ Pa·s. The zero shear viscosity refers to the viscosity of the polymeric composition at a zero shear rate and is indicative of the materials molecular structure. Further, for polymer melts, the zero shear viscosity if often a useful indicator of processing attributes such as melt strength in blow-molding and foam technologies and bubble stability in film blowing. The higher the zero shear viscosity, the better is the melt strength or bubble stability.

In an embodiment, the initial tension (IT) of the polymer resin satisfies Equation (4):

$$IT \geq -1.67 \times MI + b \quad (4)$$

wherein parameter b is equal to about 5.17, alternatively about 5.42, or alternatively about 5.67. IT is the force required to elongate a polymer strand under specified flow and draw rates. IT is a characterization of the resin extensibility by measuring the force associated with drawing a filament extruded at a constant flow rate through a standard melt indexer. Molecular parameters that affect the IT test include molecular weight, molecular weight distribution, long chain branching, crosslinking, additives, and short chain branching. In this disclosure, IT is measured using an MI barrel coupled with a constant speed plunger, constant rate haul-off barrels, and a precision force transducer to determine the force required to elongate a melt filament to a known strain. The IT of the polymer resin measured as described above is a function of the MI and parameter b.

Polymer resins produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. In an embodiment the polymer resins produced as described herein (e.g., polyethylene) may be formed into films which can be useful in food packaging.

In an embodiment, the polymer resins of this disclosure are fabricated into a film. The films of this disclosure may be produced by any suitable method and under any suitable condition for the production of films. In an embodiment, the polymer resins are formed into films through a blown film process. In a blown film process, plastic melt is extruded through an annular slit die, usually vertically, to form a thin walled tube. Air may then be introduced via a hole in the center of the die to blow up the tube like a balloon. Mounted on top of the die, a high-speed air ring blows onto the hot film to cool it. The tube of film then continues upwards, continually cooling, until it passes through nip rolls where the tube is flattened to create what is known as a lay-flat tube of film. This lay-flat or collapsed tube is then taken back down the extrusion tower via more rollers. On higher output lines, the air inside the bubble is also exchanged. This is known as Internal Bubble Cooling (IBC).

The lay-flat film is then either kept as such or the edges of the lay-flat are slit off to produce two flat film sheets and wound up onto reels. Typically, the expansion ratio between die and blown tube of film would be 1.5 to 4 times the die diameter. The drawdown between the melt wall thickness and the cooled film thickness occurs in both radial and longitudinal directions and is easily controlled by changing the volume of air inside the bubble and by altering the haul off speed. The films formed from polymer resins of this disclosure (e.g. polyethylene) may be of any thickness desired by the user. Alternatively, the polymer resins of this disclosure may be formed into films having a thickness of from about 0.1 mils to about 5 mils, alternatively from about 0.5 mils to about 3.0 mils, alternatively from about 0.8 mils to about 2.5 mils.

Production of films of the type described herein may be facilitated by the use of polymeric resins prepared as described herein. For example, polymeric resins of the type described herein when subjected to the film production process may display improved processing characteristics. In an embodiment, polymer resins of the type described herein may be extruded at a decreased extrusion pressure when compared to polymer resin of similar melt index prepared with a catalyst that has not undergone an activation comprising an oxidation, reduction, oxidation sequence. The extrusion pressure was measured by the extruder's melt pressure transducer.

For example, a polymer resin produced as described herein during processing may display an extrusion pressure that is decreased by equal to or greater than about 30%, alternatively equal to or greater than about 25%, alternatively equal to or greater than about 18% when compared to polymer resin of similar melt index prepared with a catalyst that has not undergone an activation comprising an oxidation, reduction, oxidation sequence. Such comparative catalysts may be conventional catalyst systems such as chromium-based catalysts or Ziegler Natta catalysts. In an embodiment, the comparative catalyst is an otherwise similar catalyst that has undergone a conventional activation sequence rather than an activation sequence comprising an oxidation, reduction and oxidation.

Additional improvements in processing may include a decrease in the head pressure of from about 2% to about 30%, alternatively from about 5% to about 28%, alternatively from about 10% to about 25%; and a decrease in the motor load of from about 2% to about 20%, alternatively from about 4% to about 17%, alternatively from about 5% to about 15%. Herein the head pressure refers to the discharge pressure at the end of the extruder while the motor load refers to horsepower draw of the extruder.

Further indications of the improved processing characteristics of the polymer resins may be an increase in the bubble stability during production of blown film. Improvement in bubble stability may be attributable to decreases in events or motions that adversely affect the bubble formed during the blown film process described previously herein. Events which lead to an unstable film bubble can be described as bubble breathing (vertical movement of the neck as a function of time), dancing (circular rotation of the bubble around the axis formed by the die center) or movement of the bubble relative to the die which is random in nature. These instabilities cause poor gauge distribution (i.e., variations in film thickness) and may also result in process interruptions that will generally lead to a reduction of the quantity of acceptable film that is produced. Bubble stability is a qualitative metric which may be rated on a scale of 1 to 5 wherein 1 indicates good bubble stability and 5 indicates poor bubble stability. Polymer resins of the type disclosed herein may, during the production of blown film, display a bubble stability of from 2-3 while otherwise similar resins prepared with a catalyst that has not undergone an activation comprising an oxidation, reduction, oxidation sequence may have bubble stabilities rated from 4-5.

In an embodiment, films formed from PE compositions of this disclosure may display enhanced barrier properties. For example said films may display reduced moisture vapor transmission rates (MVTR) and reduced oxygen transmission rates (OTR).

In an embodiment, a nominally 1.6-1.8 mil thick blown film produced from polymer resins of this disclosure has a gage-normalized MVTR in the range of from about 0.21 grams.mil per 100 square inch per day (g.mil/100 in$^2$/day) to about 0.33 g.mil/100 in$^2$/day, alternatively from about 0.22 g.mil/100 in$^2$/day to about 0.29 g.mil/100 in$^2$/day, or alternatively from about 0.23 g.mil/100 in$^2$/day to about 0.27 g.mil/100 in$^2$/day as measured in accordance with ASTM F 1249. The MVTR measures passage of gaseous $H_2O$ through a barrier. The MVTR may also be referred to as the water vapor transmission rate (WVTR). Typically, the MVTR is measured in a special chamber, divided vertically by the substrate/barrier material. A dry atmosphere is in one chamber, and a moist atmosphere is in the other. A 24-hour test is run to see how much moisture passes through the substrate/barrier from the "wet" chamber to the "dry" chamber under conditions which can specify any one of five combinations of temperature and humidity in the "wet" chamber.

In an embodiment, film produced from the polymer resins of this disclosure have an OTR in the range of from about 120 cubic centimeters per 100 square inch per day (cm$^3$/100 in$^2$/ day) to about 170 cm³/100 in²/day, alternatively from about 120 cm³/100 in²/day cm³/100 in²/day, or alternatively from about 125 cm³/100 in²/day to about 140 cm³/100 in²/day day as measured in accordance with ASTM D3985. OTR is the measurement of the amount of oxygen gas that passes through a film over a given period. Testing may be conducted under a range of relative humidity conditions at a range of temperatures. Typically, one side of the film is exposed to the oxygen. As it solubilizes into the film and permeates through the sample material, nitrogen sweeps the opposite side of the film and transports the transmitted oxygen molecules to a coulometric sensor. This value is reported as a transmission rate. When this rate is multiplied by the average thickness of the material, the results are considered a permeability rate.

EXAMPLES

The invention having been generally described, the following examples are given as particular embodiments of the invention and to demonstrate the practice and advantages thereof. It is understood that the examples are given by way of illustration and are not intended to limit the specification of the claims to follow in any manner. In embodiments, the polymer resins produced are used for blown film applications with excellent barrier properties. In the following examples, MVTR was measured in accordance with ASTM F-1249. A Mocon Permatron machine (model W 3/31) is used and the measurements are made at the following conditions: 37.8 ° C. and 90% relative humidity. OTR was measured in accordance with ASTM D-3985. A Mocon Ox-Trans machine (model 2/20) is used and the measurements are made at the following conditions: 23° C. and 0% relative humidity.

In the following experiments, monolayer blown films were prepared using a single layer (mono) die, a smooth bore extruder, a dual lip air-ring, and a 60 mil, die pin. The blow up ratio (BUR) was 2.0 which equaled a 25.25 in layflat width. The standard output was 250 lbx/hour and the target gauge was 1.75 mil. The films were prepared using a seated bubble and a consistent frost line height. Cooling of the film was carried out using both IBC and chilled air. Multilayer films were prepared by coextrusion using a three layer die, smooth bore extruder, dual lip air-ring, and a 60 mil. die pin. The BUR was 2.0 which equaled a 25.25 inch layflat width. The standard output was 250 lbs/hour with a target gauge of 1.6 mil and 2.5 mil. A trilayer film comprised a HDPE skin layer that was 33% of the total film thickness, a HDPE core layer that was 52% of the film thickness and a LLDPE skin layer that was 15% of the total film thickness.

Example 1

Chromium/silica-titania catalyst was obtained from W.R. Grace under the name MAGNAPORE 963 and activated in a 42-inch commercial activator via three different procedures designated P(I), P(II), and P(III). P(II) and P(III) were activated using the procedures disclosed herein for the formation of an OROC. Specifically, activation of the catalyst using the P(II) procedure involved heating 450 lbs of the Cr/silica-titania catalyst by ramping the temperature up at a rate of 2.6deg F./min. to 829° C. (1525° F.) in air over a period of about 8 hours and then holding the temperature at 829° C. (1525° F.) in air for about 2 hours. The air was then flushed out with nitrogen and the catalyst was first held in 10 mol % carbon monoxide in nitrogen for about 2 hours at 829° C. (1525° F.), and then held in nitrogen for about 4 hours at 829° C. (1525° F.). After lowering the temperature to 704° C. (1300° F.), the catalyst was treated in air for 3 hours. Activation of the catalyst using the P(III) procedure involved heating 450 lbs of the Cr/silica-titania catalyst by ramping the temperature up to 829° C. (1525° F.) in air over a period of about 8 hours. The catalyst was then held at 829° C. (1525° F.) in air for about 2 hours. After flushing out the air with nitrogen, the catalyst was contacted with 10 mol % carbon monoxide in nitrogen for about 2 hours at 829° C. (1525° F.), and then held in nitrogen for about 4 hours at 829° C. (1525° F.). After lowering the temperature to 788° C. (1450° F.), the catalyst was treated in air for 3 hours.

P(I) was activated by a "conventional procedure" which consisted of heating 450 lbs of the Cr/silica-titania catalyst by ramping the temperature up to 829° C. (1525° F.) in air over a period of about 8 hours, then holding the temperature at 829° C. (1525° F.) in air for about 8 hours.

These catalysts were then tested in a bench scale reactor to determine their activity and polymer properties, in particular the melt index potential. Polymerization runs were made in a 2.2 liter steel reactor equipped with a marine stirrer rotating at 400 rpm. The reactor was surrounded by a steel jacket containing boiling methanol with a connection to a steel condenser. The boiling point of the methanol was controlled by varying nitrogen pressure applied to the condenser and jacket, which permitted precise temperature control to within half a degree centigrade, with the help of electronic control instruments.

A small amount (0.05 to 0.12 grams normally) of the solid catalyst was first charged under nitrogen to the dry reactor. Next, 1.2 liters of isobutane liquid was charged and the reactor heated up to the desired temperature, 105° C. Ethylene was then added to the reactor to equal a fixed pressure, e,g, 550 psig, which was maintained during the experiment. The stirring was allowed to continue for around one hour, and the activity was noted by recording the flow of ethylene into the reactor to maintain the set pressure.

After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. Activity was specified as grams of polymer produced per gram of solid catalyst charged per hour.

Table 1 summarizes the activity of the catalysts produced by these activation procedures and the physical properties of the homopolymers produced by these activated catalysts which were the melt index (MI), molecular weight (MW), polydispersity index (PDI), and Carreau Yasuda 'a' parameter (CY-a) defined by Equation (3).

Catalysts activated using the procedures disclosed herein, P(II) and P(III), displayed catalyst activity comparable to the catalyst activated by the conventional procedures, P(I), but produced resins with a higher melt index (MI). It was notable that P(II) which was activated at a lower re-oxidation temperature also produced resins with a higher melt index.

TABLE 1

| Activation Procedure | Activity gPE/g-h | MI (dg/min) | $M_W$ (kg/mol) | PDI | CY-a |
|---|---|---|---|---|---|
| P(I), comparative | 6156 | 1.09 | 140 | 10.0 | 0.1653 |
| P(II) | 5284 | 10.1 | 85 | 8.7 | 0.1543 |
| P(III) | 6285 | 3.0 | 96 | 7.5 | 0.1946 |

Example 2

The activated catalysts were used in a commercial loop reactor of 18,000 gallon capacity with a reactor temperature of about 104° C. (220° F.) to catalyze ethylene polymerization. The concentration of ethylene is about 4 wt % with a residence time of about 1 hour. Homopolymers were obtained and tested for physical properties and film performance. S1 was a polyethylene resin having a melt index (MI) of about 2.0 dg/min while S2 was a polyethylene resin with a melt index (MI) of about 1.7 dg/min. Three other resins were also obtained and used to produce nominally 1.7 mil blown films whose performance was tested and are used as comparative resins. C1 was produced from a high density polyethylene blown film resin, HiD 9659, with a melt index (MI) of about 1.0 dg/min; C4 was produced from high density polyethylene MMW film grade ALATHON M6210 with a melt index (MI) of about 1.0 dg/min; and C5 was produced from high density polyethylene MMW film grade ALATHON M6020 with a melt index (MI) of about 2.0 dg/min. HiD 9659 is commercially available from Chevron Phillips Chemical Company while the ALATHON resins are commercially available from Equistar Chemicals, LP. The film performance and processing characteristics of these resins are summarized in Table 2.

required MVTR performance with fewer resins. For example, a manufacturer may be able to reduce the resin types and inventory due to the ability to manufacture monolayer films having user and/or process desired properties rather than resorting to co-extruded films that require more care and effort during processing to achieve the desired structure. The improved processing characteristics of the polymer resins produced as described herein may allow a manufacturer to improve manufacturing efficiency and positively impact manufacturing costs.

Example 3

Polymer resins with different MI values, designated samples S1-S10, were produced according to the methods disclosed herein and tested for their properties and film performance. Comparative resins were also rested for their properties and film performance. Specifically, C1 was produced from high density polyethylene blown film resin HiD 9659 with a melt index (MI) of 0.99 dg/min; C2 was produced from

TABLE 2

| RESIN | MI dg/min | Density g/cc | MVTR g · mil/100 in²/day | Bubble Stability 1 = good; 5 = poor | Head Pressure Psi | Motor Load HP | % Full Load Current amps |
|---|---|---|---|---|---|---|---|
| S1 | 2.0 | 0.9651 | 0.26 | 3 | 1400 | 16 | 31.3 |
| S2 | 1.7 | 0.9637 | 0.23 | 2 | 1570 | 17 | 32.8 |
| C1, comparative | 1.0 | 0.9649 | 0.36 | 1 | 1890 | 19 | 36.9 |
| C4, comparative | 1.0 | 0.9596 | 0.28 | 4 | 2060 | 19 | 37.5 |
| C5, comparative | 2.0 | 0.9590 | 0.25 | 5 | 1770 | 18 | 37.4 |

Resins S1 and S2 exhibited increased bubble stability when compared to the C4 and C5 resins while the films displayed comparable barrier performance as indicated by the MVTR values. Although the C1 resin displayed a higher bubble stability than the S1 or S2 resins, films produced using the S1 or S2 resins displayed improved barrier performance as indicated by the lower MVTR when compared to films produced using the C1 resin. Furthermore, the processing characteristics of the S1 and S2 resins were improved when compared to the C1, C4, or C5 resins. Specifically during processing S1 and S2 resins were processed at lower head pressures, lower motor loads, and lower full load currents. Therefore, the resins produced as described herein (i.e. using an OROC) could allow a converter to run the resin as a monolayer film and these films would display MVTR performance comparable to a co-extruded film that combines, for example, a 2 MI with a 1 MI resin. In some commercial films, a sealing layer is required to provide the film structure with the proper sealing characteristics for the final use. In such cases, co-extrusion would be required anyway. However, even in such cases, the resins produced as described herein (i.e. using an OROC) would allow the converter to make a film structure with the high density polyethylene blown film resin HiD 9659 with a melt index (MI) of 1.02 dg/min; C3 was produced from high density polyethylene blown film resin HiD 9659 with a melt index (MI) of 1.06 dg/min; C4 was produced from high density polyethylene MMW film ALATHON M6210 with a melt index (MI) of 1.00 dg/min; and C5 was produced from high density polyethylene MMW film ALATHON M6020 with a melt index (MI) of 2.00 dg/min. Table 3 summarizes the values of MI, HLMI, ratio of HLMI/MI, density, MVTR, and OTR determined for these resins and films produced from these resins.

Resins S1-S10 exhibited improved barrier performance as indicated by the lower MVTR and OTR values. The increase in barrier properties increased as the MI values became greater than 1.0 dg/min. Furthermore, the rheological properties of these samples were tested and the results summarized in Table 4 which provides the zero shear viscosity $E_o$, the relaxation time $T_\xi$, the CY-a parameter (rheological breadth parameter), and the recoverable strain parameter (RSP). The power law constant n defined in Equation (3) was set to 0.1818.

TABLE 3

| RESIN | MI dg/min | HLMI dg/min | HLMI/MI | Density g/cc | MVTR g · mil/100 in²/day | OTR cm³/100 in²/day |
|---|---|---|---|---|---|---|
| S1 | 1.97 | 107.83 | 54.74 | 0.9651 | 0.27 | 129.00 |
| S2 | 1.73 | 97.23 | 56.20 | 0.9637 | 0.23 | 131.00 |
| S3 | 0.91 | 63.83 | 70.14 | 0.9622 | 0.32 | 169.00 |
| S4 | 1.29 | 80.68 | 62.54 | 0.9638 | 0.24 | 137.00 |
| S5 | 1.33 | 87.48 | 65.77 | 0.9644 | NA | NA |
| S6 | 1.46 | 92.66 | 63.47 | 0.9650 | NA | NA |
| S7 | 1.75 | 102.99 | 58.85 | 0.9646 | NA | NA |

TABLE 3-continued

| RESIN | MI dg/min | HLMI dg/min | HLMI/MI | Density g/cc | MVTR g·mil/100 in²/day | OTR cm³/100 in²/day |
|---|---|---|---|---|---|---|
| S8 | 2.08 | 111.88 | 53.79 | 0.9645 | NA | NA |
| S9 | 2.09 | 117.02 | 55.99 | 0.9647 | 0.26 | 136.00 |
| S10 | 2.81 | 150.34 | 53.50 | 0.9656 | 0.25 | 131.00 |
| C1, comparative | 0.99 | 66.40 | 67.07 | 0.9649 | 0.39 | 172.00 |
| C2, comparative | 1.02 | NA | NA | NA | NA | NA |
| C3, comparative | 1.06 | NA | NA | NA | 0.35 | 185.00 |
| C4, comparative | 1.00 | 75.13 | 75.13 | 0.9596 | 0.30 | 132.00 |
| C5, comparative | 2.00 | 88.02 | 44.01 | 0.9590 | 0.27 | |

In this example, the samples produced using an OROC (i.e., S1-S10) had a CY-a value in the range of from about 0.17 to about 0.19, independent of their MI value. This was larger than the CY-a value of comparative samples C1, C2 and C3 but smaller than that of comparative samples C4 and C5. Comparative samples C1, C2 and C3 are produced by Ziegler-Natta catalysts, which without wishing to be limited by theory produce resins with increased long chain branching (LCB) when compared to resins produced using chromium-based catalysts. The decrease in the CY-a values suggest OROCs are able to produce polymer resins with increased rheological breadth.

TABLE 4

| RESIN | Test # | MI dg/min | $E_o$ ×10⁴ Pa·s | $T_g$s | CY-a | RSP |
|---|---|---|---|---|---|---|
| S1 | | 1.97 | 3.88 | 0.0545 | 0.1764 | 370 |
| S2 | | 1.73 | 4.50 | 0.0647 | 0.1750 | 344 |
| S3 | | 0.91 | 11.0 | 0.1968 | 0.1695 | 335 |
| S4 | | 1.29 | 6.97 | 0.1097 | 0.1707 | 327 |
| S5 | | 1.33 | 6.35 | 0.0946 | 0.1729 | 317 |
| S6 | | 1.46 | 5.49 | 0.0797 | 0.1738 | 273 |
| S7 | | 1.75 | 2.23 | 0.0292 | 0.1832 | 308 |
| S8 | | 2.08 | 3.56 | 0.0511 | 0.1788 | 302 |
| S9 | | 2.09 | 3.47 | 0.0473 | 0.1769 | 301 |
| S10 | | 2.81 | 2.19 | 0.0301 | 0.1815 | 277 |
| C1, comparative | | 0.99 | 9.59 | 0.1462 | 0.1619 | 368 |
| C2, comparative | | 1.02 | 12.0 | 0.1521 | 0.1555 | 378 |
| C3, comparative | | 1.06 | 10.6 | 0.1426 | 0.1563 | 374 |
| C4, comparative | (1) | 1.00 | 3.35 | 0.2104 | 0.2699 | 258 |
| C4, comparative | (2) | 1.00 | 3.31 | 0.2103 | 0.2712 | 256 |
| C4, comparative | (3) | 1.00 | 3.79 | 0.1820 | 0.2548 | 266 |
| C5, comparative | | 2.00 | 1.05 | 0.0303 | 0.2977 | 141 |

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k^*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A polymeric resin having a density of greater than 0.960 g/cc, a melt index of from about 1.3 g/10 min. to about 2.8 g/10 min., a zero shear viscosity of from about 1×10⁴ Pa*s to about 1×10⁵ Pa*s, a recoverable shear parameter of from about 220 to about 370, a CY-a parameter of from about 0.155 to about 0.200 and a ratio of HLM/MI of from greater than about 50 to about 70, wherein the resin when formed into a film has a moisture vapor transmission rate of from about 0.21 g.mil/100 in²/day to about 0.33 g.mil/100 in²/day.

2. A film produced from the resin of claim 1.

3. The resin of claim 1 wherein the resin displays a bubble stability of from 2-3.

4. The resin of claim 1 wherein the resin displays a decrease in a head pressure of from about 2% to about 30% when compared to polymer resin having a melt index of from about 1.3 g/10 min. to about 2.8 g/10 min. prepared with a catalyst that has not undergone an activation comprising an oxidation, reduction, or oxidation sequence.

5. The resin of claim 1 wherein the resin displays a decrease in a motor load of from about 2% to about 20% when compared to polymer resin having a melt index of from about 1.3 g/10 min. to about 2.8 g/10 min. prepared with a catalyst that has not undergone an activation comprising an oxidation, reduction, or oxidation sequence.

6. The resin of claim 1 wherein the resin comprises polyethylene.

7. The film of claim 2 having a thickness of from about 0.1 mils to about 5 mils.

8. The film of claim 2 wherein the film has an oxygen transmission rate of from about 120 cm$^3$/100 in$^2$/day to about 170 cm$^3$/100 in$^2$/day.

9. A food packaging container comprising the film of claim 2.

10. A polymeric resin having a density of greater than 0.960 g/cc, an initial tension defined by the equation IT≥−1.67*(MI)+b where b is 5.1, a CY-a parameter of from about 0.155 to about 0.200, a percent decrease in the extrusion pressure of the resin of about 30% when compared to polymer resin having a melt index of from about 1.3 g/10 min. to about 2.8 g/10 min. prepared with a catalyst that has not undergone an activation comprising an oxidation, reduction, or oxidation sequence and a ratio of HLM/MI of from greater than about 50 to about 70 wherein the resin when formed into a film has a moisture vapor transmission rate of from about 0.21 g.mil/100 in$^2$/day to about 0.33 g.mil/100 in$^2$/day.

11. A film produced from the resin of claim 10.

12. The resin of claim 10 wherein the resin displays a bubble stability of from 2-3.

13. The resin of claim 10 wherein the resin comprises polyethylene.

14. The resin of claim 10 wherein the resin displays a decrease in a head pressure of from about 2% to about 30% when compared to polymer resin having a melt index of from about 1.3 g/10 min. to about 2.8 g/10 min. prepared with a catalyst that has not undergone an activation comprising an oxidation, reduction, or oxidation sequence.

15. The resin of claim 10 wherein the resin displays a decrease in a motor load of from about 2% to about 20 when compared to polymer resin having a melt index of from about 1.3 g/10 min. to about 2.8 g/10 min. prepared with a catalyst that has not undergone an activation comprising an oxidation, reduction, or oxidation sequence.

16. The film of claim 11 wherein the film has an oxygen transmission rate of from about 120 cm$^3$/100 in$^2$/day to about 170 cm$^3$/100 in$^2$/day.

17. The film of claim 11 having a thickness of from about 0.1 mils to about 5 mils.

18. A food packaging container comprising the film of claim 11.

19. The resin of claim 1 having a density of greater than about 0.962 g/cc.

20. The resin of claim 10 having a density of greater than about 0.962 g/cc.

* * * * *

UNITED STATES PATENT AND TRADEMARK OFFICE
CERTIFICATE OF CORRECTION

PATENT NO.        : 8,852,748 B2            Page 1 of 1
APPLICATION NO.   : 12/394636
DATED             : October 7, 2014
INVENTOR(S)       : Sukhadia et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 285 days.

Signed and Sealed this
Seventeenth Day of May, 2016

Michelle K. Lee
*Director of the United States Patent and Trademark Office*